(12) United States Patent
Fabien et al.

(10) Patent No.: US 8,437,798 B2
(45) Date of Patent: *May 7, 2013

(54) UPLINK SCHEDULING SUPPORT IN MULTI-CARRIER WIRELESS COMMUNICATION SYSTEMS

(75) Inventors: Jean-Aicard Fabien, Lincolnshire, IL (US); Robert T. Love, Barrington, IL (US); Vijay Nangia, Algonquin, IL (US); Ravikiran Nory, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 428 days.

This patent is subject to a terminal disclaimer.

(21) Appl. No.: 12/430,883

(22) Filed: Apr. 27, 2009

(65) Prior Publication Data

US 2010/0273515 A1  Oct. 28, 2010

(51) Int. Cl.
  *H04M 1/00* (2006.01)
(52) U.S. Cl.
  USPC ........................................ 455/552.1
(58) Field of Classification Search .................. 455/522, 455/552.1, 553.1
  See application file for complete search history.

(56) References Cited

U.S. PATENT DOCUMENTS

| 6,377,809 | B1 * | 4/2002 | Rezaiifar et al. ............. 455/455 |
| 7,492,737 | B1 | 2/2009 | Fong et al. |
| 7,693,032 | B2 | 4/2010 | Li et al. |
| 2006/0280142 | A1 | 12/2006 | Damnjanovic et al. |
| 2008/0130589 | A1 | 6/2008 | Gorokhov et al. |
| 2009/0279500 | A1 | 11/2009 | Luo et al. |
| 2010/0040004 | A1 | 2/2010 | Damnjanovic et al. |
| 2010/0091725 | A1 | 4/2010 | Ishii |
| 2010/0098012 | A1 | 4/2010 | Bala et al. |
| 2010/0111023 | A1 | 5/2010 | Pelletier et al. |
| 2010/0113004 | A1 | 5/2010 | Cave et al. |
| 2010/0118805 | A1 | 5/2010 | Ishii et al. |
| 2010/0157895 | A1 | 6/2010 | Pani et al. |
| 2010/0158147 | A1 | 6/2010 | Zhang et al. |
| 2010/0226327 | A1 | 9/2010 | Zhang et al. |
| 2010/0227569 | A1 | 9/2010 | Bala et al. |
| 2010/0232373 | A1 | 9/2010 | Nory et al. |
| 2010/0238882 | A1 | 9/2010 | Zhang et al. |
| 2010/0246463 | A1 | 9/2010 | Papaskellariou et al. |
| 2010/0272019 | A1 | 10/2010 | Papaskellariou et al. |
| 2010/0272091 | A1 * | 10/2010 | Fabien et al. ................. 370/345 |
| 2010/0273520 | A1 | 10/2010 | Pelletier et al. |

FOREIGN PATENT DOCUMENTS

| KR | 10-2009-0101786 A | 9/2009 |
| WO | 2004040797 A1 | 5/2004 |
| WO | 2008108228 A1 | 9/2008 |
| WO | 2009040773 A2 | 4/2009 |

(Continued)

OTHER PUBLICATIONS

U.S. Appl. No. 12/430,886 Fabien et al., filed Apr. 27, 2009, Non-Final Rejection dated Dec. 12, 2010.

(Continued)

*Primary Examiner* — Lincoln Donovan
*Assistant Examiner* — Khareem E Almo

(57) ABSTRACT

A method in a wireless communication terminal that supports aggregated carrier access including determining power headroom for a first carrier based on first carrier control information, determining power headroom for at least one additional carrier based on the first carrier control information, and transmitting a power headroom report based on the power headroom of the first carrier or the power headroom of the at least one additional carrier.

22 Claims, 2 Drawing Sheets

FOREIGN PATENT DOCUMENTS

| WO | 2010051513 A2 | 5/2010 |
|---|---|---|
| WO | 2010051514 A1 | 5/2010 |
| WO | 2010065759 A2 | 6/2010 |

OTHER PUBLICATIONS

Patent Cooperation Treaty, "PCT Invitation to Pay Additional Fees and, Where Applicable, Protest Fees" for International Application No. PCT/US2010/030970 Nov. 4, 2010, 5 pages.

Patent Cooperation Treaty, "PCT Search Report and Written Opinion" for International Application No. PCT/US2010/030970 Feb. 10, 2011, 18 pages.

3GPP TSG RAN WG1 Meeting #56BIS; "PUSCH Power Control for LTE-Advanced" Nokia Siemens Networks, Nokia; Seoul, Korea, Mar. 23-27, 2009; R1-091372, 4 pages.

3GPP TS 36.331 V8.5.0 (Mar. 2009); 3rd Generation Partnership Project; Technical Specification Group Radio Access Network; Evolved Universal Terrestrial Radio Access (E-UTRA) Radio Resource Control (RRC); Protocol Specification (Release 8).

3GPP TSG-RAN WG2 Meeting #66; San Francisco, United States, May 3-7, 2009; Report on Email Discussion on "U-Plane Aspects for DC HSUPA" Draft Version 01; R2-09xxxx.

3GPP TSG RAN WG1 #56 Meeting; Athens, Greece, Feb. 9-13, 2009; Pusch Power Control for LTE_Advanced; R1-090738.

3GPP TSG RAN WG2 Meeting #71, R2-104806 "Primary Cell Change" Motorola, Madrid, Spain, Aug. 23-27, 2010, 3 pages.

3GPP TSG RAN WG2 Meeting #71, R2-104807 "Further Details on Power Headroom Reporting" Motorola, Madrid, Spain, Aug. 23-27, 2010, 2 pages.

3GPP TS 25.321 V8.4.0 (Dec. 2008), 3rd Generation Partnership Project; Technical Specification Group Radio Access Network; Medium Access Control (MAC) Protocol Specification (Release 8).

3GPP TS 25.331 V8.5.0 (Dec. 2008), 3rd Generation Partnership Project; Technical Specification Group Radio Access Network; Radio Resource Control (RRC); Protocol Specification (Release 8).

3GPP TS 25.214 V8.5.0 (Mar. 2009), 3rd Generation Partnership Project; Technical Specification Group Radio Access Network; Physical Layer Procedures (FDD) (Release 8).

3GPP TS 36.321 V8.4.0 (Dec. 2008), 3rd Generation Partnership Project; Technical Specification Group Radio Access Network; Evolved Universal Terrestrial Radio Access (E-UTRA Medium Access Control (MAC) Protocol Specification (Release 8).

3GPP TS 36.331 V8.4.0 (Dec. 2008), 3rd Generation Partnership Project; Technical Specification Group Radio Access Network; Evolved Universal Terrestrial Radio Access (E-UTRA) Radio Resource Control (RRC); Protocol Specification (Release 8).

3GPP TS 36.133 V8.4.0 (Dec. 2008), 3rd Generation Partnership Project; Technical Specification Group Radio Access Network; Evolved Universal Terrestrial Radio Access (E-UTRA); Requirements for Support of Radio Resource Management (Release 8).

3GPP TS 36.213 V8.6.0 (Mar. 2009), 3rd Generation Partnership Project; Technical Specification Group Radio Access Network; Evolved Universal Terrestrial Radio Access (E-UTRA); Physical Layer Procedures (Release 8).

Narasimha et al., "Method and Apparatus for Power Headroom Reporting During Multi-Carrier Operation" U.S. Appl. No. 61/374,821, filed Aug. 17, 2010, 28 pages.

3GPP TSG RAN WG2 Meeting #70, 3GPP TSG RAN WG1 Meeting #61, Montreal, Canada, May 10-14, 2010, R1-103405, "LS on Power Headroom Reporting for Carrier Aggregation" Montreal, Canada, May 10-14, 2010, R2-103445, 1 page.

United States Patent & Trademark Office, "Final Rejection" for U.S. Appl. No. 12/430,886 Jul. 7, 2011, 14 pages.

Patent Cooperation Treaty, "PCT Search Report and Written Opinion of the International Searching Authority" for International Application No. PCT/US2011/047988 Jan. 13, 2012, 26 pages.

3GPP TSG RAN WG3 #70bis, R2-103724 "Discussion on CC specific PHR reporting" ZTE, Stockholm, Sweden, Jun. 28-Jul. 2, 2010, 4 pages.

3GPP TSG RAN WG2 #70bis, R2-103725 "Parallel transmission of two types PHR" ZTE, Stockholm, Sweden, Jun. 28-Jul. 2, 2010, 6 pages.

3GPP TSG RAN WG2 #70bis, R2-103665 "Analysis on the open issues of PHR for carrier aggregation" New Postcom, Stockholm, Sweden, Jun. 28-Jul. 2, 2010, 4 pages.

3GPP TSG RAN WG2 #70, R2-102879 "Considerations on PHR for CA" Alcatel-Lucent Shanghai Bell, Alcatel-Lucent, Montreal, Canada, May 10-14, 2010, 4 pages.

Japanese Patent Office, First Office Action for Japanese Patent Application No. 2012-503787 dated Feb. 4, 2013, 3 pages.

\* cited by examiner

UPLINK SCHEDULING SUPPORT IN MULTI-CARRIER WIRELESS COMMUNICATION SYSTEMS

FIELD OF THE DISCLOSURE

The present disclosure relates generally to wireless communications and, more particularly, to uplink scheduling support in multi-carrier wireless communication systems, for example, the transmission of power headroom and/or buffer status information with carrier aggregation.

BACKGROUND

In multi-carrier systems with carrier aggregation, a user terminal may be paired to or monitor adjacent multiple carriers associated with the same or multiple base stations. The user terminal may also be paired to or monitor multiple carriers associated with the same or different base stations in different frequency bands. Additionally, asymmetric carrier aggregation is possible in frequency division duplex (FDD) mode with different numbers of downlink and uplink carriers aggregated for a user terminal; under these circumstances, one or more of the downlink/uplink carriers do not have a corresponding or associated uplink/downlink carrier (fixed channel spacing). It may also be possible that only a subset of carriers being aggregated (e.g., carriers served by a base station) have a common scheduler (possibly a common MAC entity) resulting in multiple independent schedulers for different subsets of the aggregated carriers.

In some multi-carrier systems, generally, transmit power control (TPC) can be configured independently for different aggregated uplink carriers or a subset of aggregated uplink carriers. Independent TPC may be used to support different quality of service (QoS) requirements, different traffic types with different block error rate (BLER) operating points and different interference levels (IoT) across different aggregated carriers. In some implementations, multiple PAs serve multiple aggregated carriers, for example, aggregation across different frequency bands with a power amplifier for each band.

Per-component carrier TPC and closed-loop power control (PC) commands also provide an additional degree of freedom to adjust UE power in addition to modulation coding scheme (MCS) adaptation, for example, near the lowest/highest MCS settings. In 3GPP LTE, per-component carrier TPC requires the definition and signaling of carrier-specific open loop power control parameters such as $P_O$, $\alpha$ and PL and possibly closed loop PC command $\delta_{PUSCH}/\delta_{PUCCH}$. In the following description we assume independent power control for the different carriers. However, the details are also applicable for the case when common power control is performed for a group or subset of carriers.

A component carrier specific power control has also been proposed in R1-090738. The LTE Rel-8 power control for a single carrier can be straightforwardly extended to support component carrier specific power control as suggested in R1-090738.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
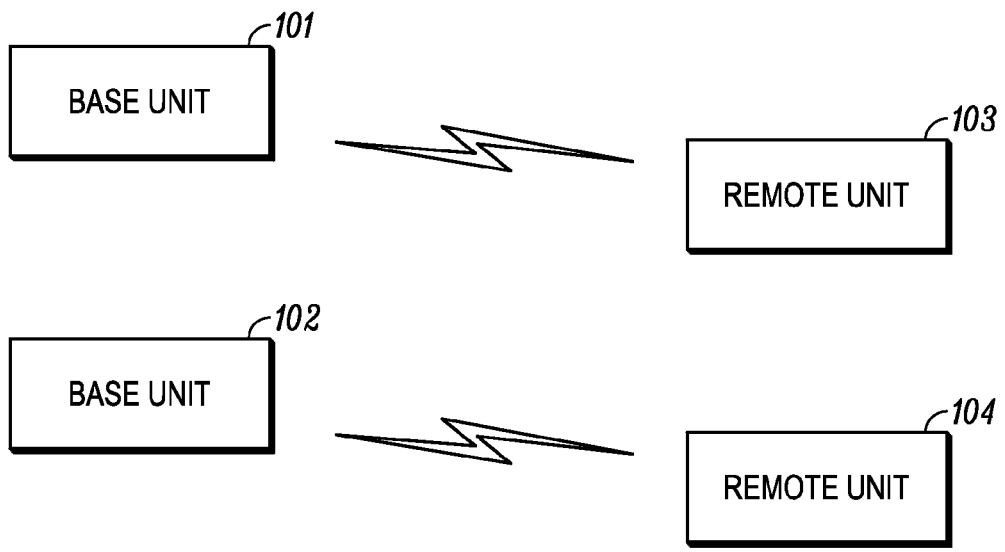
FIG. 1 illustrates a multi-carrier wireless communication system.

In FIG. 1, a multi-carrier wireless communication system 100 comprises one or more fixed base infrastructure units 101, 102 forming a network distributed over a geographical region for serving remote units in the time and/or frequency and/or spatial domain. A base unit may also be referred to as an access point, access terminal, base, base station, Node-B, eNode-B, Home Node-B, Home eNode-B, relay node, or by other terminology used in the art. The one or more base units each comprise one or more transmitters for downlink transmissions and one or more receivers for receiving uplink transmissions. The base units are generally part of a radio access network that includes one or more controllers communicably coupled to one or more corresponding base units. The access network is generally communicably coupled to one or more core networks, which may be coupled to other networks like the Internet and public switched telephone networks among others. These and other elements of access and core networks are not illustrated but are known generally by those having ordinary skill in the art.

In FIG. 1, the one or more base units serve a number of remote units 103, 104 within a corresponding serving area, for example, a cell or a cell sector, via a wireless communication link. In one implementation, the remote units support aggregated carrier access. The remote units may be fixed or mobile. The remote units may also be referred to as subscriber units, mobiles, mobile stations, users, terminals, subscriber stations, user equipment (UE), user terminals, wireless communication devices, or by other terminology used in the art. The remote units also comprise one or more transmitters and one or more receivers. The base unit 101 transmits downlink communication signals to serve remote unit 103 in the time and/or frequency and/or spatial domain. The remote unit 104 communicates with base unit 102 via uplink communication signals. Sometimes the base unit is referred to as a "serving" or connected or anchor cell for the remote unit. The remote units may have half duplex (HD) or full duplex (FD) transceivers. Half-duplex transceivers do not transmit and receive simultaneously whereas full duplex terminals do. The remote units may also communicate with the base unit via a relay node.

Figure 2:
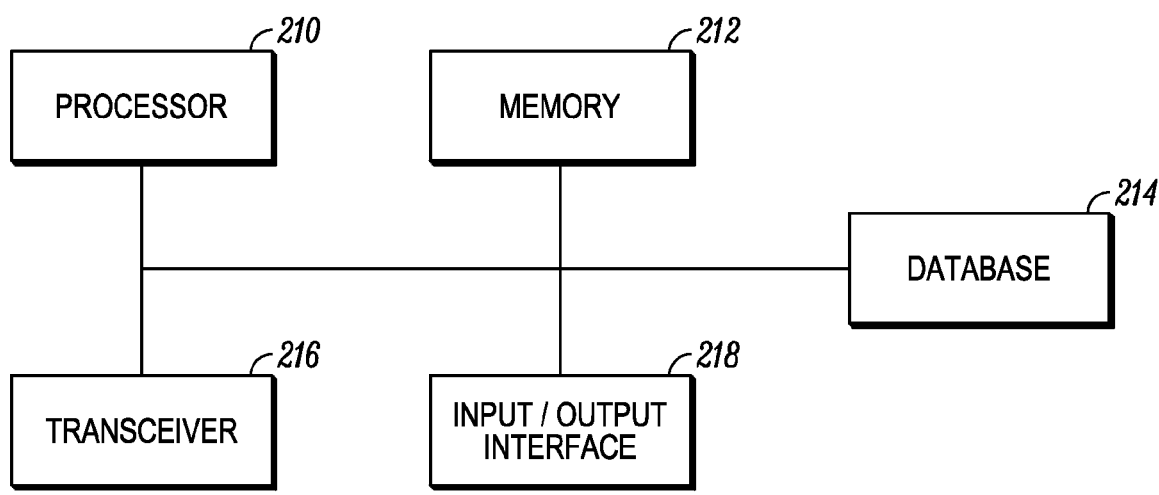
FIG. 2 illustrates a wireless communication terminal.

In FIG. 2, a wireless communication terminal 200 comprises a controller/processor 210 communicably coupled to memory 212, a database 214, a transceiver 216, input/output (I/O) device interface 218 connected through a system bus 220. The wireless communication terminal 200 may be implemented as a base unit or a remote unit and is compliant with the protocol of the wireless communication system within which it operates, for example, the 3GPP LTE Rel-8 or later generation protocol discussed above. The controller/processor 210 may be implemented as any programmed processor. However, the functionality described herein may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. The memory 212 may include volatile and nonvolatile data storage, including one or more electrical, magnetic or optical memories such as a random access memory (RAM), cache, hard drive, readonly memory (ROM), firmware, or other memory device. The memory may have a cache to speed access to specific data. Data may be stored in the memory or in a separate database. The database interface 214 may be used by the controller/processor to access the database. The transceiver 216 is capable of communicating with user terminals and base stations pursuant to the wireless communication protocol implemented. In some implementations, e.g., where the wireless communication unit is implemented as a user terminal, the wireless communication unit includes an I/O device interface 618 that connects to one or more input devices that may include a keyboard, mouse, pen-operated touch screen or monitor, voice-recognition device, or any other device that accepts input. The I/O device interface may also connect to one or more output devices, such as a monitor, printer, disk drive, speakers, or any other device provided to output data.

In one implementation, the wireless communication system is compliant with the 3GPP Universal Mobile Telecommunications System (UMTS) protocol. In another implementation, the wireless communication system is compliant with the 3GPP Universal Mobile Telecommunications System (UMTS) LTE protocol, also referred to as EUTRA or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. In yet another implementation, the wireless communication system is compliant with the 3GPP Universal Mobile Telecommunications System (UMTS) LTE-Advanced protocol, also referred to as LTE-A or some later generation or release of LTE, wherein the base unit can transmit using an orthogonal frequency division multiplexing (OFDM) modulation scheme on a single or a plurality of downlink component carriers and the user terminals can transmit on the uplink using a single or plurality of uplink component carriers. More generally the wireless communication system may implement some other open or proprietary communication protocol, for example, WiMAX, among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternate embodiments, the wireless communication system may utilize other communication system protocols including, but not limited to TDMA or direct sequence CDMA. The communication system may be a TDD (Time Division Duplex) or FDD (Frequency Division Duplex) system.

The disclosure relates generally to efficient transmission of a UE Power Headroom Report (PHR) and/or a Buffer Status Report (BSR) with carrier aggregation and more specifically uplink carrier aggregation with component carriers belonging to or associated with the same base station or with different base stations (possibly with different schedulers). The carriers that are jointly scheduled may be explicitly or implicitly indicated to the UE by a broadcast message, a scheduling grant/assignment or by higher-layer such as RRC (Radio Resource Control) signaling.

Efficiency of component carrier-specific power control can be improved by utilizing component carrier-specific power headroom reports (PHRs). The power headroom of all or a subset of the aggregated component carriers can be included in a PHR report. Additionally, for an architecture with a single power amplifier (PA) serving a group of component carriers, there may be a need for an aggregate PA headroom report corresponding to the aggregated signal constructed from the component signals of each carrier, for example, an anchor and as well as component carriers. The UE can be configured by UE-specific higher layer signaling such as a radio resource control (RRC) to report power headroom for all or a subset of the aggregated carriers. The PHR can be periodic and/or it may be triggered based on changes in any component carrier's downlink path loss by a certain network configured offset (and expiry of the prohibitPHR-Timer as in 3GPP LTE Rel-8). Thus, the UE or wireless communication terminal may transmit the power headroom report only when a time elapsed from a previous power headroom report is greater than a time elapsed timer threshold.

A combined PHR report including the power headroom for each or a subset of the aggregated component carriers configured by UE-specific higher layer signaling such as component carriers with the highest and lowest power headroom, component carriers with the highest and next highest power headroom, anchor carrier and component carriers with the highest power headroom, with carrier identification information such as relative carrier index, PCID (Physical Cell ID), Global Cell ID etc. may be generated to signal the power headroom of the component carriers in an efficient manner. For example, the PHR report can comprise the power headroom of the anchor carrier along with possibly a differential value for the other component carrier. Thus, in one embodiment, the power headroom of the at least one additional carrier may be encoded as a differential power headroom relative to the power headroom of the first carrier.

In one implementation, as with power headroom reporting, the Buffer Status Report (BSR) can be efficiently communicated by signaling only one BSR report for each subset of the component carriers that have a common scheduler.

In 3GPP LTE systems, the UE is scheduled explicitly by the serving eNodeB for uplink transmission and retransmission. Scheduling requests, Power Headroom Reporting and Buffer status reporting are not done using a composite packet. A scheduling request is sent by the UE to request a grant for new transmission. Buffer Status Reporting (BSR) and Power Headroom Reporting (PHR) have different trigger mechanisms. BSR may be triggered and/or periodic. Triggered BSR is cleared after reception of an UL grant that can accommodate all pending data available for transmission. PHR may also be triggered and/or periodic. However the criteria for PHR notably the downlink path loss and the reporting timer may be set such that on a per component carrier basis the UE never transmits a PHR or transmits it at a much slower rate or over a longer period. But the BSR per carrier for an LTE system would still be the same for each carrier. Therefore there is a need to setup a similar mechanism as proposed for UMTS systems in the description below, i.e., set criteria for transmission of BSR per joint scheduler. So also for LTE systems, the UE may need to be aware for uplink scheduling if all the carriers are within an eNodeB or not.

One issue that may be also relevant for carrier aggregation is Radio Link Failure (RLF). In case of carrier aggregation within the same eNodeB, i.e., a common scheduler, RLF can be tied to the anchor or serving carrier. However, for the case of an aggregated component carrier belonging to more than one eNodeB, the UE may handle RLF recovery differently for each eNB. The RLF recovery may be based on a current LTE REL-8 procedure, i.e., using RACH preamble or possibly coordination between eNodeBs, to exchange timing information (like SFN) to enable the UE to re-sync without using the RACH. Another issue is the possible timing difference and procedure to handle a timing difference between aggregated carriers especially with non-adjacent inter-band carrier aggregation.

Some possible embodiments on PHR, BSR, SI, UPH, TEBS, Scheduling information (SI), UE Power Headroom (UPH), Total Enhanced Dedicated Channel (E-DCH) Buffer Status (TEBS), Highest priority Logical channel Buffer Status (HLBS), Highest priority Logical channel ID (HLID) signaling and signaling fields are described below for UMTS HSPA and LTE with carrier aggregation.

In 3GPP LTE Rel-8 supporting only a single carrier, the Power Headroom (PH) for a subframe is defined as $$PH = P_{CMAX} - \{10 \log_{10}(M_{PUSCH}) + P_{O\_PUSCH} + \alpha \cdot PL + \Delta_{TF} + f(\delta_{PUSCH})\} [dB]$$

where $M_{PUSCH}$ is the PUSCH resource allocation bandwidth signaled to UE in terms of a number of RBs allocated to the UE in the subframe, PL is the downlink path loss estimate, $P_{0\_PUSCH}$ and $\alpha$ are the open loop power control parameters, $\delta_{PUSCH}$ is the closed loop PC command, and $\Delta_{TF}$ is the Modulation and Coding Rate (MCR or MPR) based transmission power offset, $\Delta_{TF} = 10 \log_{10}((2^{MPR \cdot Ks} - 1)\beta_{offset}^{PUSCH})$.

Figure 3:
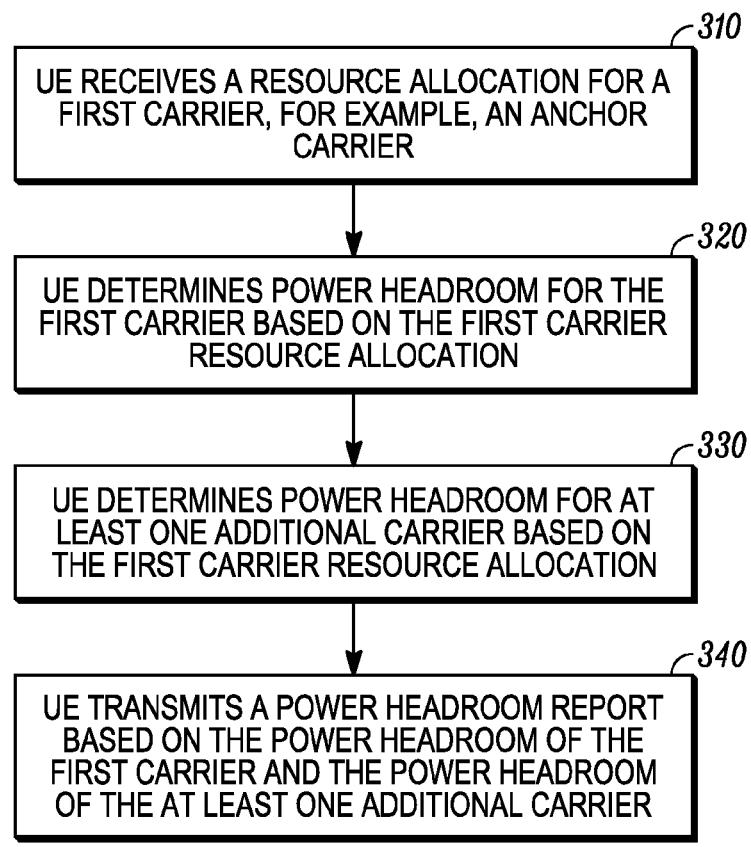
FIG. 3 illustrates a process flow diagram.

In the implementation illustrated in FIG. 3, at 310, a wireless communication terminal, or UE, that supports aggregated carrier access receives a resource allocation for a first carrier, for example an anchor carrier. Alternatively, the UE may receive control information comprising at least one or more of a resource allocation for the first carrier or power control information for the first carrier. At 320, the UE determines power headroom for the first carrier based on the first carrier resource allocation or first carrier control information. At 330, the terminal determines power headroom for at least one additional carrier based on the first carrier resource allocation or first carrier control information. At 340, the UE transmits a power headroom report based on the power headroom of the first carrier and the power headroom of the at least one additional carrier. In one implementation, the UE includes a controller embodied as a digital processor that is configured to control and/or perform the functionality of the UE upon execution of software or firmware. In one embodiment, the power headroom of the at least one additional carrier may be encoded as a differential power headroom relative to the power headroom of the first carrier.

Extending the power headroom equation to carrier aggregation would require a grant in each component carrier (or the subset of configured carriers) for computing the power headroom for that carrier. This is inefficient in cases where the UE does not need an allocation on a component carrier. Additionally, power headroom for a component carrier cannot be computed when the UE is not scheduled for data transmission on that carrier. Thus, it is proposed that a UE compute the power headroom for a component carrier, k, based on:

Resource allocation on the component carrier k if the UE has UL resources allocated for new transmission in the subframe for the component carrier k $$PH(k) = P_{CMAX}(k) - \{10 \log_{10}(M_{PUSCH}(k)) + P_{O\_PUSCH}(k) + \alpha(k) \cdot PL(k) + \Delta_{TF}(k) + f(\delta_{PUSCH}(k))\} [dB]$$

else, Resource allocation on the Anchor carrier, $k_{Anchor}$, if the UE does not have an UL allocation in the subframe on the component carrier k $$PH(k) = P_{CMAX}(k) - \{10 \log_{10}(M_{PUSCH}(k_{Anchor})) + P_{O\_PUSCH}(k) + \alpha(k) \cdot PL(k) + \Delta_{TF}(k) + f(\delta_{PUSCH}(k))\} [dB]$$

As the UE does not have an UL allocation in the subframe on the component carrier k, the MPR in the $\Delta_{TF}(k)$ can also be based on the anchor carrier MPR. In the above equations, $P_{CMAX}(k)$ is the maximum UE power on the component carrier which is a function of UE power class, the network configured max power for each component carrier, Maximum Power Reduction/Additional-Maximum Power Reduction (MPR/A-MPR) requirements for each component carrier, and is given by $$P_{CMAX}(k) = \mathrm{MIN}\{P_{EMAX}(k), P_{UMAX}(k)\}$$

where $P_{EMAX}(k)$ is the maximum allowed power configured by higher layers and defined in [3GPP TS36.331] for component carrier k. Depending on the carrier aggregation scenario, it is possible for $P_{EMAX}$ to be the same for all or a subset of carriers thereby requiring signaling of one value for the subset of carriers possibly along with the component carrier index.

$P_{UMAX}(k)$ is the maximum UE power for the UE power class adjusted, MPR, A-MPR for component carrier k that the UE computes and carrier band specific correction $\Delta_{TC}$.

$M_{PUSCH}(k)$ is the PUSCH resource allocation bandwidth in a number of RBs on component carrier k.

$M_{PUSCH}(k_{Anchor})$ is the resource allocation bandwidth of the anchor carrier PL(k) is the downlink path loss estimate for component carrier k, $P_{O\_PUSCH}(k)$ and $\alpha(k)$ are the open loop power control parameters for component carrier k, $\delta_{PUSCH}(k)$ is the closed loop PC command for component carrier k, $\Delta_{TF}(k)$ is the Modulation and Coding Scheme (MCS) based transmission power offset for component carrier k, and f (k) is the current PUSCH power control adjustment state for component carrier k.

The parameters P0_PUSCH (k), (k), PUSCH (k), $\Delta_{TF}(k)$ can be considered as transmission power control information for component carrier k. MPR/A-MPR/A-MPR requirements for each component carrier are typically specified to ensure that a LTE or LTE-A UE can meet spectrum emission requirements at reasonable transmission power levels.

As in 3GPP LTE Rel-8, the Path Loss (PL) estimate can be based on the reference symbol received power (RSRP) measurement on each component carrier. Alternatively, the PL estimate of other component carriers can be based on adjustments to the PL estimate of the anchor carrier based on the frequency separation of the component carrier from the anchor carrier. This adjustment offset can be computed based on an equation as a function of the frequency difference or signaled to the UE via broadcast or RRC signaling. This may be for the case of non-contiguous collocated carriers or for non-collocated non-contiguous (or contiguous) carriers.

As with transmission power control parameters, some of the power headroom parameters may be the same or common for all or a subset of the aggregated carriers. A signaling bit or bit map in a control message can indicate whether a parameter or a set of parameters is the same or different for the different component carriers.

For architectures with a single power amplifier (PA) serving a group of component carriers, the power setting of each component carrier may be apportioned based on the ratio of the power required for the component carrier based on the TPC of that component carrier to the total power required for the group of component carrier. In addition, the power for a component carrier may be adjusted such that the difference (in dB) or ratio (in linear scale) is less than a threshold.

In some embodiments, the power headroom report is transmitted only intermittently and in other embodiments the power headroom report is transmitted more regularly according to a schedule. In a particular implementation, the power headroom report is transmitted based on a change in pathloss of either the first carrier or the at least one additional carrier. For example, the power headroom report may be transmitted only when the change in pathloss satisfies a pathloss change condition or threshold. More generally, the power headroom report may be transmitted based on change in a channel metric of either the first carrier or the at least one additional carrier. For example, the power headroom report may only be transmitted when a change in the channel metric of either the first carrier or the at least one additional carrier satisfies a channel metric change threshold. The channel metric change threshold can be a predefined threshold or can be signaled to the UE via RRC signaling.

In some other embodiments, the power headroom report may be transmitted based on a change in Reference Signal Received Power (RSRP) of either the first carrier or the at least one additional carrier. In another example, determining when to transmit the power headroom report may be based on the resource allocation information in the scheduling assignments of the first carrier and the at least one additional carrier. In another example, determining when to transmit the power headroom report may be based on determining if the resource allocation information in the scheduling assignments of the first carrier and the at least one additional carrier causes a negative power headroom. In other embodiments, other criterion may be used as the basis for determining when to transmit the power headroom report.

In some embodiments, determining when to transmit the power headroom report comprises determining a subframe instance when to transmit the power headroom report.

In one embodiment, the power headroom of the first carrier and the power headroom of the at least one additional carrier are determined based on additional maximum power reduction (A-MPR) information associated with the first carrier. In another embodiment, the power headroom of the first carrier is determined based on transmission power control information of the first carrier, and the power headroom of the at least one additional carrier is determined based on transmission power control information of the at least one additional carrier. The transmission power control information that forms the basis for the power headroom computation includes but is not limited to the parameters $P_{0\_PUSCH}(k)$, $\alpha(k)$, $\delta_{PUSCH}(k)$, $\Delta_{TF}(k)$.

In another embodiment, the power headroom of the first carrier is determined based on a pathloss of the first carrier and the power headroom of the at least one additional carrier is determined based on a pathloss of the at least one additional component carrier. In a related embodiment, determining the power headroom of the at least one additional carrier based on the path loss of the first carrier can comprise adjusting the path loss of the first carrier by a path loss offset based on a frequency separation between the first carrier and the at least one additional carrier. The path loss offset can either be signaled to the UE by the base station or can be determined by the UE via path loss measurements.

In another embodiment, PHR reporting may also support carrier aggregation across different frequency bands with different propagation characteristics. In such cases one PHR may be used for each frequency band. In a frequency band, the UE can support multiple carriers with a PHR for one or carriers.

In one embodiment, a wireless communication terminal, or UE, that supports a plurality of transmitters, determines power headroom for a first transmitter based on control information for a first transmitter. The terminal determines power headroom for at least one additional transmitter based on the first transmitter control information, carrier resource allocation or first carrier control information. The terminal transmits a power headroom report based on the power headroom of the first transmitter and the power headroom of the at least one additional transmitter. The control information may comprise a resource allocation for the first transmitter and/or power control information for the first transmitter. The terminal may receive the control information on a downlink control channel. In one embodiment, the power headroom of the at least one additional carrier may be encoded as a differential power headroom relative to the power headroom of the first carrier. In another embodiment, the first transmitter is associated with a first carrier and the at least one additional transmitter is associated with at least one additional carrier. In another embodiment, the first transmitter may be associated with a first carrier and the at least one additional transmitter associated with the first carrier. This may correspond to the case of MIMO or Multi-Input Multi-Output transmission.

In one embodiment, the power headroom of the at least one additional carrier may be encoded as a differential power headroom relative to the power headroom of the first carrier.

More generally, the power headroom of the first carrier and the power headroom of the at least one additional carrier may be determined based combinations of some or all of the criteria discussed above.

In another embodiment, the power headroom of the first carrier can be a Uplink Power Headroom (UPH) determined based on the following:

$$UPH_k = P_{km\,ax,tx}/P_{k\,DPCCH}$$

where Pkmax,tx=min {Maximum allowed UL TX Power, $P_{max}$} is the UE maximum transmission power. The maximum allowed UL TX Power is set per carrier. $P_{max}$ is a transmission power limit and is based on the UE class. $P_{iDPCCH}$ is the power of the uplink Dedicated Physical Control Channel (DPCCH) set by the UE based on the TPC command from the downlink control signal of the first carrier. Based on the aggregated carrier configuration of the carriers attached to the UE, the power setting of the uplink DPCCH for each carrier may be based on the first carrier downlink TPC commands. Alternatively the power of the uplink DPCCH of each carrier may be based on each individual downlink TPC command. Accordingly, $UPH_k$ for each carrier may be derived based on downlink control information from the first carrier or based on downlink control information of each carrier.

Figure 4:
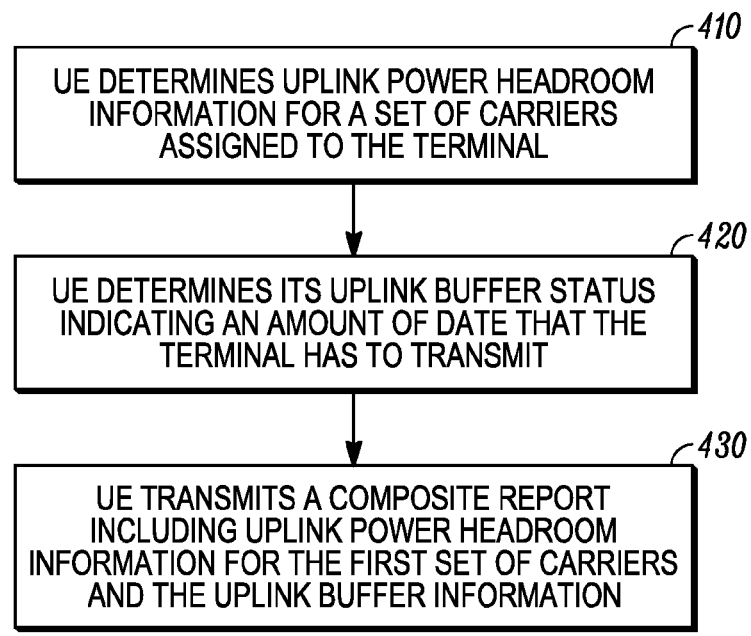
FIG. 4 illustrates another process flow diagram.

In another implementation illustrated in FIG. 4, at 410, a wireless communication terminal, or UE, that supports aggregated carrier access determines UE Power Headroom (UPH) information for a first set of carriers assigned to the terminal. At 420, the UE determines its uplink buffer status indicating an amount of data that the terminal has to transmit. At 430, the UE transmits a first composite report including the UPH information for the first set of carriers and the uplink buffer information.

In one particular implementation, the first set of carriers comprises multiple carriers and the UE determines a highest UPH associated with one carrier of a set of carriers and a lowest UPH associated with another carrier of the same set of carriers, wherein the UPH information includes only the highest UPH and the lowest UPH of the set of carriers and associated carrier identification information.

In one embodiment, the first set of carriers is associated with a first base station and a second set of carriers is associated with a second base station. Thus the UE also determines UPH information for the second set of carriers assigned to the terminal. The UE transmits the first composite report to the first base station and the UE transmits a second composite report including the UPH for the second set of carriers to the second base station. Generally, the UE receives an indication identifying the set of carriers, for example the first set of carriers associated with the first base station and the second set of carriers associated with the second base station.

In a UMTS HSPA single carrier system, uplink scheduling requires the UE to transmit Scheduling Information (SI) to the serving cells. Based on the SI and the uplink cell load, the serving cells allocate grants to the UE using a unique identifier designated as the E-DCH Radio Network Temporary Identifier (E-RNTI). The network may incrementally increase or decrease a UE grant using relative grants signaling. For a multiple carrier WCDMA system, one approach is to keep the uplink signaling independent per carrier. Some uplink scheduling messages are required on a per carrier basis, for example the relative grants for the serving and non-serving cell allow control of uplink interference commonly know as Rise over Thermal. Other Uplink scheduling signaling messages may contain the same information. For example the SI contains the following fields:

| SI Fields | SI Field size (bits) |
|---|---|
| UPH | 5 |
| TEBS | 5 |
| HLBS | 4 |
| HLID | 4 |

While the UE power headroom may be different per carrier, the UE buffer size fields are expected to be same.

One way to optimize the signaling is to have the UE (for 2 ms TTI for example) request grants for some type of traffic on some HARQ processes and on different carriers for different HARQ processes. One difficulty is what criteria the UE should use to decide what SI to send to which carrier. These criteria should be based on the uplink interference measure of each carrier. A more accurate uplink interference measure is available at the serving NodeB. In addition, partitioning the SI request per carrier would not reduce the uplink signaling traffic. However, if the carriers do not have the same scheduler, partitioning the SI request would avoid the UE getting multiple grants for the same traffic.

One alternative is to send a composite SI with additional multiple values of the fields that are different per carrier: for the UPH for example. The SI would contain the following for example:

| SI Fields | SI Field size (bits) |
|---|---|
| UPH Carrier 1 | 5 |
| UPH Carrier i | 5 |
| --- | --- |
| UPH Carrier N | 5 |
| TEBS | 5 |
| HLBS | 4 |
| HLID | 4 |

The NodeB may send one absolute grant that the UE may use to transmit E-DCH data on any of the carrier serving cells, or the NodeB may send on absolute grant per carrier that the UE may use for each specific carrier.

Another alternative is for the case of N carriers with N>2 with a joint scheduler, the UE may send an SI only with the Highest UPH and the lowest UPH values (or component carriers with the highest and next highest power headroom, anchor carrier and component carriers with the highest UPH) associated with a carrier designation:

| SI Fields | SI Field size (bits) |
|---|---|
| Highest UPH | 5 |
| Carrier ID | 2 |
| Lowest uPH | 5 |
| Carrier ID | 2 |
| TEBS | 5 |
| HLBS | 4 |
| HLID | 4 |

In case the SI includes the UPH for the anchor carrier, the carrier designation may be omitted. In order to allow minimum error decoding an additional field should be added to designate the SI type hence:

| SI Fields | SI Field size (bits) |
|---|---|
| SI type | 2 |
| UPH field 1 | — |
| UPH field 2 | — |
| --- | — |
| UPH field N | — |
| TEBS | 5 |
| HLBS | 4 |
| HLID | 4 |

SI type  00 = {UPH for all carriers, without carrier IDs}
         11 = {Highest UPH, Lowest UPH, each with Carrier ID}

However a composite SI message sent by the UE assumes that the carriers uplink scheduling have a joint scheduler. If the carriers do not have a joint scheduler, the UE may send a composite SI to a serving cell within each group of carriers having the same scheduler. Carrier grouping information needs to be indicated to the UE as part of the system information block. If the NodeB is providing absolute grants over a group of carriers controlled by a joint scheduler, the UE needs to be assigned a specific Enhanced Uplink Radio Network Temporary ID associated with the carrier group.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication terminal that supports aggregated carrier access, the method comprising:
   receiving carrier control information for a first carrier;
   determining power headroom for the first carrier based on carrier control information,
   determining power headroom for at least one additional carrier based on the carrier control information, transmitting a power headroom report based on the first power headroom of the first carrier and the second power headroom of the at least one additional carrier.

2. The method of claim 1, wherein the first carrier control information comprises either a resource allocation for the first carrier or power control information for the first carrier.

3. The method of claim 1, encoding the second power headroom of the at least one additional carrier as a differential power headroom relative to the first power headroom of the first carrier.

4. The method of claim 1,
determining when to transmit the power headroom report based on a channel metric of either the first carrier or the at least one additional carrier,
transmitting the power headroom report upon determining when to transmit the power headroom report.

5. The method of claim 1, determining when to transmit the power headroom report based on pathloss.

6. The method of claim 1, determining when to transmit the power headroom report based on either a reference signal received power or resource allocation information.

7. The method of claim 1, transmitting the power headroom report only when a change in the channel metric of either the first carrier or the at least one additional carrier satisfies a channel metric change threshold.

8. The method of claim 1,
determining the first power headroom of the first carrier based on additional maximum power reduction (A-MPR) information associated with the first carrier,
determining the second power headroom of the at least one additional carrier based on A-MPR information associated with the at least one additional carrier.

9. The method of claim 1,
determining the first power headroom of the first carrier based on transmission power control information of the first carrier,
determining the second power headroom of the at least one additional carrier based on transmission power control information of the at least one additional carrier.

10. The method of claim 1,
determining the first power headroom of the first carrier based on pathloss of the first carrier,
determining the second power headroom of the at least one additional carrier based on pathloss of at least one of the first carrier and the at least one additional component carrier.

11. The method of claim 10, determining the second power headroom of the at least one additional carrier based on the path loss of the first carrier comprises adjusting the path loss of the first carrier by a path loss offset based on a frequency separation between the first carrier and the at least one additional carrier.

12. A wireless communication terminal that supports a plurality of transmitters, the terminal comprising:
determining a first power headroom for a first transmitter based on a control information for the first transmitter,
determining a second power headroom for at least one additional transmitter based on the first transmitter control information,
transmitting a power headroom report based on one or more of power headroom of the first transmitter and the power headroom of the at least one additional transmitter.

13. The terminal of claim 12, the first transmitter associated with a first carrier and the at least one additional transmitter associated with at least one additional carrier.

14. A wireless communication terminal that supports aggregated carrier access, the terminal comprising:
a transceiver;
a controller coupled to the transceiver,
the controller configured to determine a first power headroom for the first carrier based on a first carrier resource allocation received at the transceiver,
the controller configured to determine a second power headroom for at least one additional carrier based on the first carrier resource allocation, and
the controller configure to cause the transceiver to transmit a power headroom report based on the first power headroom of the first carrier and the second power headroom of the at least one additional carrier.

15. The terminal of claim 14,
the controller configured to determine when to transmit the power headroom report based on path loss of either the first carrier or the at least one additional carrier,
the controller configured to cause the transceiver to transmit the power headroom report upon determining when to transmit the power headroom report.

16. The terminal of claim 14, the controller configured to cause the transceiver to transmit the power headroom report only when a change in path loss of either the first carrier or the at least one additional carrier satisfies a path loss change threshold.

17. The terminal of claim 14,
the controller configured to determine the first power headroom of the first carrier based on an additional maximum power reduction (A-MPR) information associated with the first carrier,
the controller configured to determine the second power headroom of the at least one additional carrier based on an A-MPR information associated with the at least one additional component carrier.

18. The terminal of claim 14,
the controller configured to determine the first power headroom of the first carrier based on transmission power control information of the first carrier,
the controller configured to determine the second power headroom of the at least one additional carrier based on transmission power control information of the at least one additional carrier.

19. The terminal of claim 14,
the controller configured to determine the first headroom of the first carrier based on path loss of the first carrier,
the controller configured to determine the second headroom of the at least one additional carrier based on path loss of the at least one additional component carrier.

20. A wireless communication terminal that supports aggregated carrier access, the terminal comprising:
a transceiver;
a processor coupled to the transceiver,
the processor configured to determine a first power headroom for a first carrier,
the processor configured to determine a second power headroom for at least one additional carrier,
the wireless communication terminal configured to transmit a power headroom report including the first power headroom of the first carrier and the second power headroom of the at least one additional carrier if a change in a channel metric of the first carrier or the at least one additional carrier satisfies a condition.

21. The terminal of claim 20, wherein the channel metric is pathloss, the wireless communication terminal configured to transmit the power headroom if the change in pathloss of the first carrier or the at least one additional carrier satisfies a condition.

22. The terminal of claim 20, wherein the channel metric is reference signal receive power, the wireless communication terminal configured to transmit the power headroom if the change in reference signal receive power of the first carrier or the at least one additional carrier satisfies a condition.

* * * * *